United States Patent Office 3,458,334
Patented July 29, 1969

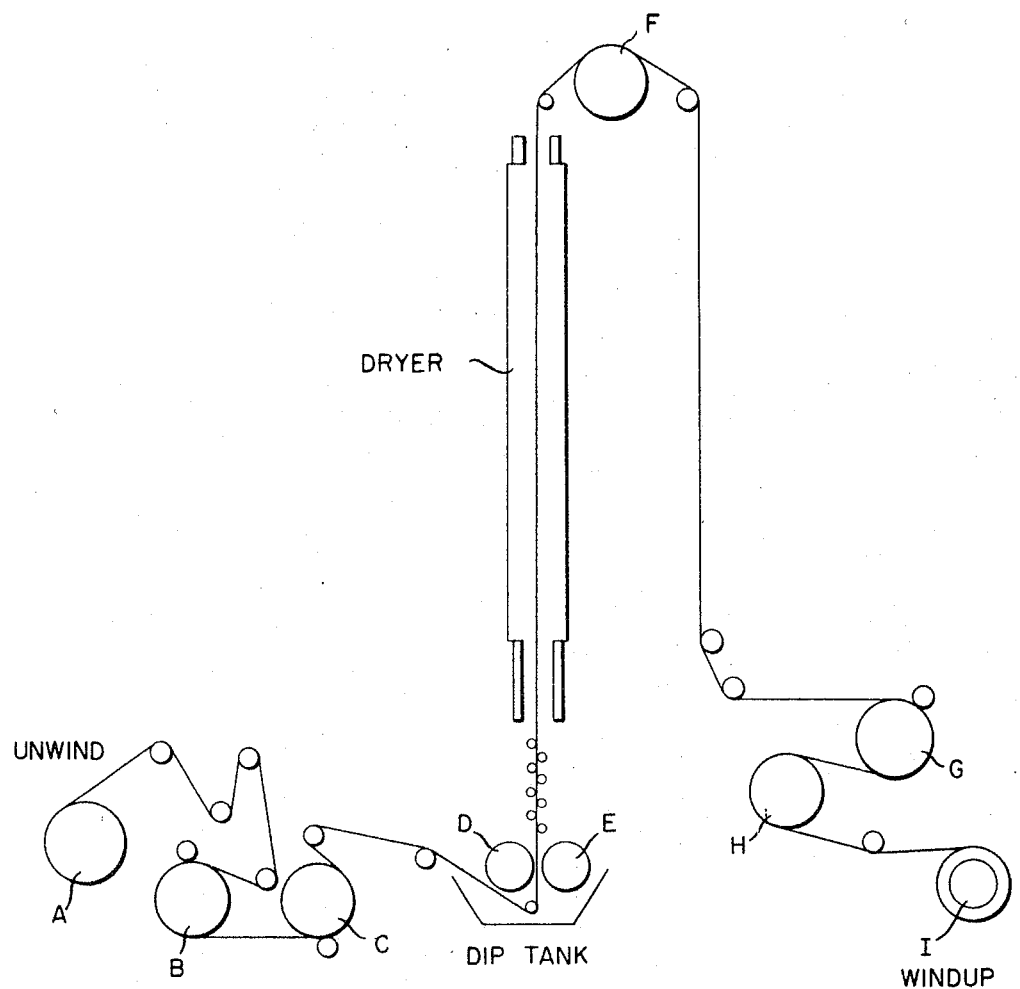

3,458,334
PROCESS FOR PRODUCING WRINKLE-FREE COATED FILM
Miklos Wallenfels, Buffalo, N.Y., assignor to E. I. du Pont de Nemours and Company, Wilmington, Del., a corporation of Delaware
Filed May 11, 1965, Ser. No. 454,814
Int. Cl. B29d 7/24; B44d 1/24
U.S. Cl. 117—7                2 Claims This invention relates to the application of aqueous polymeric dispersion coatings onto thermoplastic films. More particularly this invention is directed to coating heat sensitive thermoplastic films with aqueous vinylidene chloride copolymer dispersions.

It is well known to apply coatings to various polymeric films to improve certain properties of the films, for example, heat sealability, impermeability to water vapor, oxygen or carbon dioxide and to improve resistance to greases and the like. In the production of coated films it is essential, in order to realize optimum properties in the coated product, that a uniform coating be applied.

In applying coatings to thermoplastic films it is common practice in the process to draw the film to be coated through a suitable bath of the coating material such as an aqueous dispersion of a given polymer and thereafter to draw the film bearing the coating solution or dispersion through an elongated opening between a pair of doctor rolls so as to remove excess coating bath and to deposit across the area of the base layer a uniform amount of coating bath.

A complication that arises in the coating of various polymeric films is that as the film is drawn through the opening between the doctor rolls it tends to be non-flat, that is, wrinkles and striations tend to form with the result that a non-uniform application of coating is left on the substrate. This leads to a non-uniformity in the coated product with respect to barrier properties of the given film, and in ability to be heat sealed as well as the production of film with obvious defects such as wrinkles, folds, and the like. This problem is especially severe in the case of films such as those which are heat shrinkable. It is also observed in films such as biaxially oriented polypropylene films which have been treated as described in Belgian patent specification No. 638,742 to provide dimensional stability and sheet flatness, but have been stored for some time prior to coating. In other words, films which have a tendency to deform or which when stored in a mill roll for some time show evidence of wrinkling when unrolled even though such films have been given prior stabilizing treatments such as are described above. It is evident therefore that the requirements for applying uniformly satisfactory coatings on such films is stringent indeed.

Accordingly, it is an object of this invention to provide an improved process for the application of coatings on thermally sensitive films. It is a further object to provide an improved method for applying coatings uniformly on biaxially oriented polyolefin films.

These objects are realized in an improved process for applying aqueous polymeric dispersion coatings to thermally sensitive, tension deformable, plastic films comprising the steps of (1) drawing the film from an unwind roll at such a tension that said film is elongated between 0.50 and 1.0%, (2) advancing the film over a metal roll heated at a temperature in the range of 65° C. to 80° C. while further elongating the film between 0.75 and 1.25%, (3) further advancing said film over a second metal roll heated at a temperature in the range of 30° C. and 45° C. while permitting the film to retract in the machine direction an amount between 0.75 and 1.25%, (4) immediately thereafter advancing said film through a dip tank containing the coating dispersion and drawing the film bearing the coating dispersion through an elongated opening between doctor rolls to remove excess coating dispersion and (5) thereafter advancing the film through a series of smoothing rolls to smooth the coatings and through a heated zone to dry the coating after which the coated film is cooled and, if desired, wound on a receiving roll.

In the preferred embodiment of this invention the film is biaxially oriented, dimensionally stabilized polypropylene film, which has been subjected to flame treatment for adherability prior to being coated. The film is drawn over a first heated roll at a temperature between about 70–75° C. while it is elongated to the extent of approximately 1.0%. The film is then drawn over a second roll heated to a temperature in the range of 30–35° C. while the film is permitted to retract approximately 1% and then is fed directly into the dip tank of the coating apparatus containing an aqueous dispersion of a vinylidene chloride copolymer and thence through the opening between the metering doctor rolls. The films is then advanced through a series of smoothing rolls adjusted to such tension that an additional elongation of approximately 1.25% in the film occurs during the smoothing operations. The film is then conducted through a suitable drying chamber wherein the coated film is heated to a minimum temperature of about 75° C. but below its deformation temperature to dry the film after which it is passed over cooling rolls and wound on a receiving roll.

The invention will be more clearly understood by reference to the attached drawing which is a diagrammatic illustration of one arrangement of apparatus suitable for practicing the process of this invention. As indicated in the drawing, the film is unwound from the roll position A over a nest of snubbing rolls and is then fed onto roll B which is heated to the required temperature following which the film advances to roll C also heated and thereafter the film is conveyed through the dip tanks containing the coating bath. The film bearing the coating bath is then advanced through the opening between the doctor rolls which are set at a predetermined position depending upon the amount of coating that is desired on the base film and is thereafter conveyed through the series of smoothing rolls and then through the heating zone to remove the solvent and to dry the film, then conveyed over the head roll F to the chill rolls G and H to cool the film to substantially room temperature after which the film is wound on roll I.

In a typical example and with reference to the attached drawing, a film of polypropylene film extruded and biaxially oriented by the process of Goldman and Wallenfels, U.S. Patent No. 3,141,912 issued July 21, 1964, dimensionally stabilized according to the procedure described in Belgian patent specification No. 638,742 and flame treated as described in Belgian patent specification No. 637,744 was unwound from roll A at such tension as to give elongation of 0.75%. The film was drawn over the nest of rolls and finally over roll B which is heated at a range of 70–75° C. while the film was elongated to the extent of 1.0%, then drawn over roll C while permitting a retraction of 1.0% as the temperature of the roll was held at about 93° F. The film was then conveyed through the dip tank containing a 40% solids dispersion of a 77/19/4 by weight vinylidene chloride/methyl acrylate/acrylic acid copolymer, excess dispersion was removed by the doctor rolls, the wet coating was smoothed by passing the film through the series of rolls and the film was thereafter passed through the drying chamber wherein it attained a temperature of 80° C. and was finally wound on the windup roll by I. It was observed that the film on passing through the opening between the doctor rolls was flat with no indication of wrinkling or striation occurring. The application of coating was uniform across the sheet with corresponding uniformity in heat sealability and barrier properties. Furthermore, the wound roll of coated film showed no evidence of striations or hard bands across the sheet which would be an indication of non-uniform coating application.

By contrast, the same film drawn through the apparatus but without the heating and elongation and retraction at rolls B and C showed many small wrinkles and striations as it was drawn through the opening between the doctor rolls. The subsequently dried film showed evidence of hard bands as the film was wound on a mill roll and the coating was decidedly non-uniform across the sheet. Furthermore, the coated film showed extreme variability across the sheet in respect to ability to be heat sealed.

Substantially the same results were obtained with a film of biaxially oriented, heat set polyethylene terephthalate film and similar results were effected with heat shrinkable films made from polyethylene terephthalate as described in Grabenstein, U.S. Patent No. 2,784,456 issued Mar. 12, 1957, and heat shrinkable films based on biaxially oriented polypropylene and on a blend of high density and low density polyethylene.

The process of this invention can be used for coating a variety of film including those normally considered to be dimensionally stable or heat set but which are thermally sensitive and deformable to a degree as well as the so-called heat shrinkable films, that is, films which will shrink at least 10% upon immersion in boiling water. Representative thermoplastic films usefully coated according to this invention include those of the polyolefins such as polyethylene and polypropylene, polyvinyl chloride, polyvinyl fluoride, polyethylene terephthalate, polystyrene, copolymer films, polyamides, cellulose derivative and the like.

The coating materials are generally those based on aqueous polymeric dispersions many of which are well known in the art and include for example vinylidene chloride copolymers, vinylidene chloride/methylacrylate/itonic acid terpolymer, vinylidene chloride/methylacrylate/acrylic acid terpolymer, other copolymers of vinylidene chloride with acrylic and methacrylic acid esters, with acrylonitrile, methacrylonitrile, terpolymers of such copolymers with acrylic and methacrylic acids and the like. Ordinarily aqueous dispersion of about 15% to 65% solids content can be used but no limitation on the present invention is intended in this regard. As indicated the drying of the coated film should be such that the film reaches a temperature of at least 75° C., below this temperature the freshly coated film tends to be subject to blocking.

With regard to the amount of elongation and retraction as well as temperatures of which these precoating treatments are effected, the amount of elongation in any one step should not exceed about 1.25% and with respect to the overall coating process it is desired that the overall extension of the film in the machine direction during the coating process should not exceed a total of about 2.0%. If a greater amount of extension is effected, resulting physical properties of the coated film may be impaired. Furthermore, with respect to the temperature at which the precoating treatment should be effected, it is desired that the temperature be not greater and desirably somewhat below the deformation temperature of the film where "deformation temperature" is defined as that temperature at which the film without restraint undergoes a change in dimension of at least 5%.

The invention claimed is:

1. The process for applying a coating of an aqueous polymeric dispersion to a thermally sensitive, tension deformable, plastic film which comprises the steps of (1) drawing said film from an unwind roll at such a tension that said film is elongated between 0.5 and 1%, (2) advancing said film over a first metal roll heated at a temperature in the range of 65° to 80° C. while further elongating said film between 0.75 and 1.25%, (3) further advancing said film over a second metal roll heated at a temperature in the range of 30° to 45° C. while permitting said film to retract in the machine direction an amount between 0.75 and 1.25%, (4) immediately thereafter advancing said film through a dip tank containing said dispersion and drawing said film bearing the newly applied coating through an elongated opening between doctor rolls to remove excess coating dispersion, (5) advancing said film through a series of smoothing rolls to smooth the coating, (6) advancing said film through a heated drying zone, and (7) cooling the coated film.

2. The process for applying a coating of an aqueous dispersion of a vinylidene chloride copolymer to a biaxially oriented, dimensionally stabilized polypropylene film which has been subjected to flame treatment for improved adherability, said process comprising the steps of (1) drawing said film from an unwind roll at such a tension that said film is elongated between 0.5 and 1%, (2) advancing said film over a first metal roll heated at a temperature in the range of about 70° to 75° C. while further elongating said film about 1%, (3) further advancing said film over a second metal roll heated at a temperature in the range of 30° to 35° C. while permitting said film to retract in the machine direction about 1%, (4) immediately thereafter advancing said film through a dip tank containing said aqueous vinylidene chloride copolymer dispersion and drawing said film bearing the newly applied coating through an elongated opening between doctor rolls to remove excess coating dispersion, (5) advancing said film through a series of smoothing rolls adjusted to such tension that an additional elongation of about 1.25% occurs while the coating is being smoothed, (6) advancing said film through a drying zone at a temperature in the range from about 75° C. to the deformation temperature of said film to dry said coating, (7) cooling the coated film, and (8) wind up the finished film on a receiving roll.

References Cited

UNITED STATES PATENTS

| | | | |
|---|---|---|---|
| 3,353,991 | 11/1967 | Shelburg | 117—138.8 |
| 3,286,009 | 11/1966 | Yumoto et al. | 117—7 X |
| 3,264,136 | 8/1966 | Hedge | 117—7 X |
| 3,054,690 | 9/1962 | Miller et al. | 117—7 |
| 3,022,543 | 2/1962 | Baird et al. | 117—47 X |
| 2,968,576 | 1/1961 | Keller et al. | 117—138.8 X |

ALFRED L. LEAVITT, Primary Examiner

ALAN GRIMALDI, Assistant Examiner

U.S. Cl. X.R.

117—138.8